Figure 1:
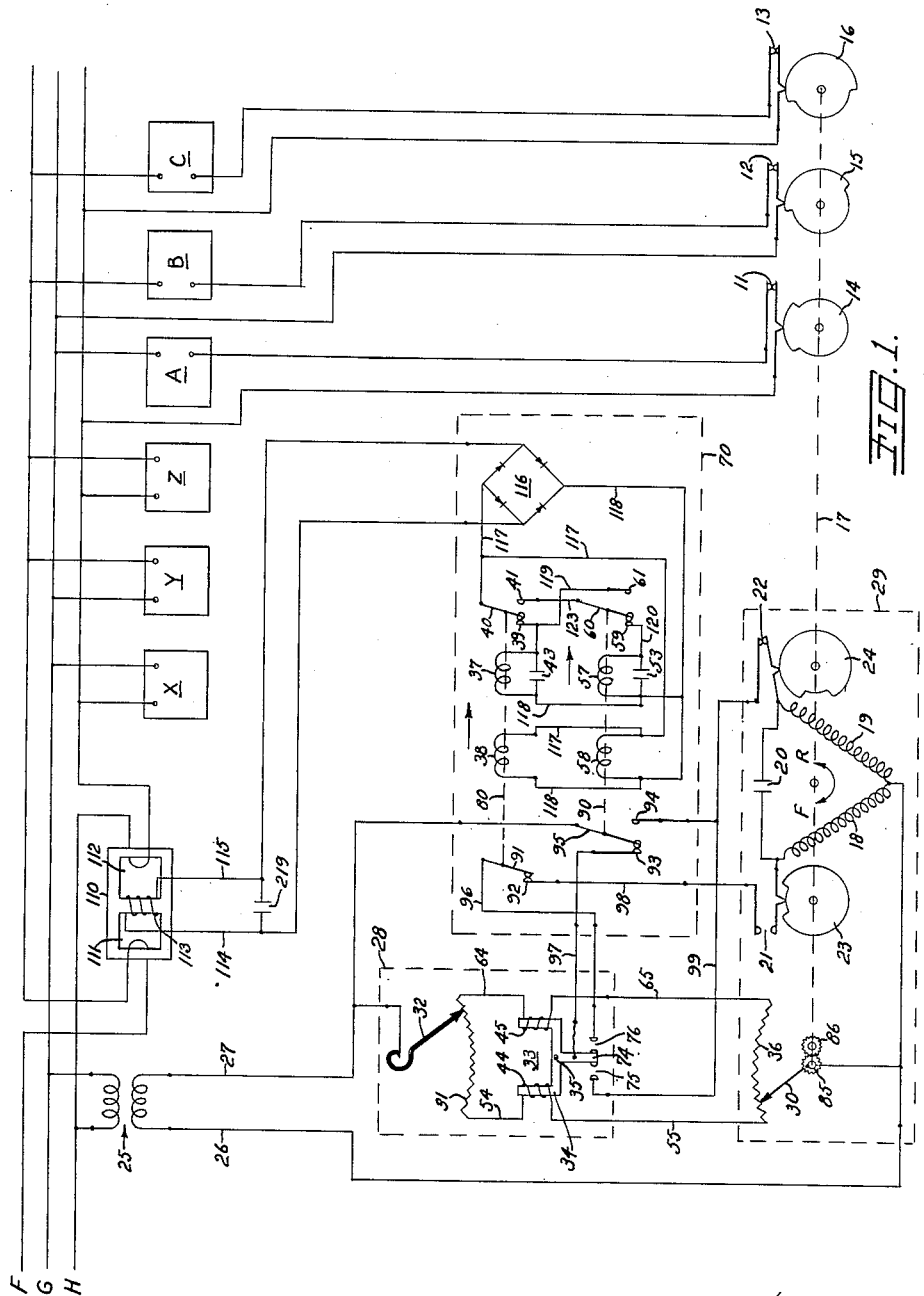

July 26, 1955

E. F. KINGSLEY 2,714,171

LOAD STABILIZED ELECTRIC SYSTEM

Filed July 16, 1953

2 Sheets-Sheet 1

INVENTOR
Errol F. Kingsley

BY

Mark Richardson

AGENT

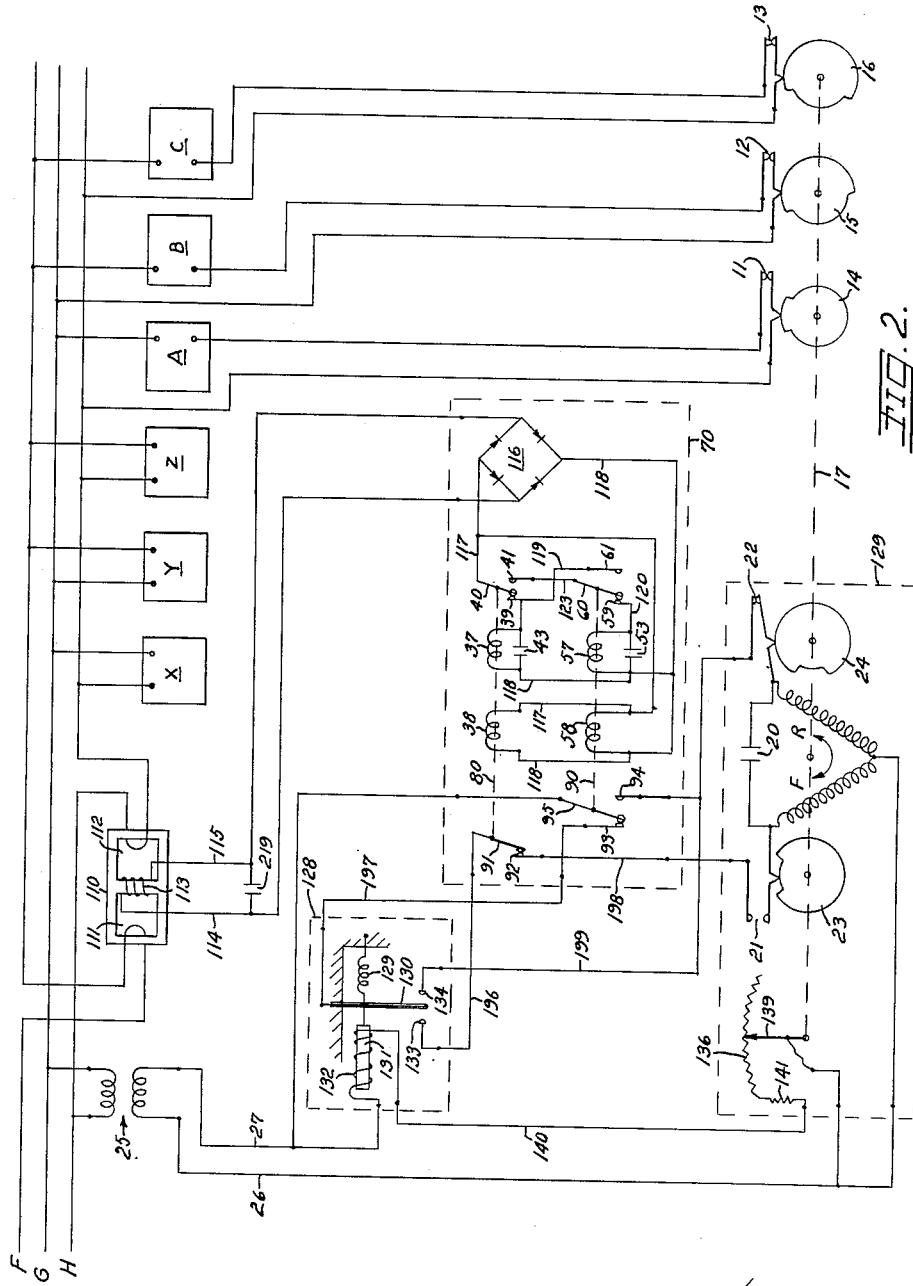

United States Patent Office 2,714,171
Patented July 26, 1955

2,714,171

LOAD STABILIZED ELECTRIC SYSTEM

Errol F. Kingsley, Portland, Oreg., assignor to Iron Fireman Manufacturing Company, Portland, Oreg.

Application July 16, 1953, Serial No. 368,398

5 Claims. (Cl. 307—35)

This invention relates generally to the art of controlling a system of multiple electric loads for maximum service availability without exceeding a preset total load limit.

Attention is called to my prior U. S. Patents, No. 2,635,196, issued April 14, 1953, and No. 2,637,822, issued May 5, 1953.

More particularly my present invention provides an electric system of multiple electric loads some of which are thermostatically controlled and of different relative importance, including means for providing a maximum availability of loads for use without exceeding for any appreciable time a preset total load limit.

It is well known that electric loads are usually controlled either manually or automatically to be used only as needed and that in the usual installation having multiple electric loads the total connected load far exceeds the average use of power. Also it is well known that if no means are provided to diversify the use of the several loads a hardship is imposed on the electric utility providing the power for the installation because of readiness to serve requirements of an uncontrolled installation. For this reason the utility companies generally have had to impose additional charges for exceeding a reasonably specified load demand for a reasonable limit of time.

It is a principal object of my invention here described to provide means for diversifying the use periods of some of the loads of multiple load electric installation to give a maximum availability of service to the separate loads without exceeding the total load above which a demand charge is imposed.

It is a second object to provide this availability to the loads in the order of their relative importance.

It is a third object to provide this availability to some of the thermostatically controlled loads of the installation.

It is a fourth object to provide this availability to these thermostatically controlled loads whether the loads are grouped under the control of a single thermostat to provide varying increments of load for a single purpose or whether the loads are individually controlled by individual thermostats to provide power as needed for individual purposes.

It is a fifth object to provide motor driven means for connecting to a power source in the order of their relative importance some of the loads of different relative importance of an electric installation and therewith to provide means for limiting the total installation load to a preset value.

It is a sixth object to provide modulating or proportioning means for controlling such loads when the total load is below a preset value.

It is a seventh object to provide means for sensing the total load on the system and means controlled by said sensing means for disconnecting loads in the inverse order of their relative importance should a preset total load value be exceeded.

How these and other objects are attained will be clear from the following description referring to the attached drawings in which Fig. 1 illustrates schematically a system in which a modulating thermostat in a space to be heated controls a companion reversing motor at a switch center to connect or disconnect as required by the thermostat a multiple of electric heating loads all adapted to supply heat to the space in which the thermostat is located, together with means for providing the maximum availability of the heating loads without exceeding a preset total load limit for an appreciable length of time. Fig. 2 illustrates schematically a similar system with a different type of thermostat and reversing motor control.

Additionally, I have described by reference to Figs. 1 and 2 how the same effective results are accomplished in my system if each of the loads are provided with individual thermostats and the overall thermostat is omitted.

Like numerals of reference refer to like parts in the two figures of the drawings.

Referring now to Fig. 1 of the drawings there is indicated the three wires of an electric supply line which can be either three phase or three wire or can be any desired service arrangement so long as the electric equipment attached to it is so adapted. Connected to the electric service are shown typically three loads of continuous importance X, Y, and Z, which although not so shown, would have the usual code means for connection thereto. Additionally these loads usually would be under the control of some sort of switches, either manual or otherwise, to control their operation in accordance with the need therefore.

Also connected to the electric service are shown typically three loads of lesser and unequal importance A, B, and C, which also would have the usual code means for connection thereto, but pertinent to my system there would be interposed between these loads and the electric service the cam operated switches 11, 12, and 13, adapted to be operated respectively by cams 14, 15, and 16 fixed to shaft 17 of a single phase reversible, capacitor type, motor 29 having windings 18 and 19 and phase shifting capacitor 20. Motor forward and reverse rotation limit switches are shown respectively at 21, and 22 to be operated by cams 23 and 24 fixed to shaft 17.

A control service transformer is shown at 25 with its primary leads connected to the electric service wires so that it will supply control power at usually about 25 volts from its secondary leads 26, 27 to the control apparatus circuits as shown.

Within the dotted line 28 is shown schematically a common form of potentiometer thermostat adapted to be used with and control the switch operating motor shown schematically within the dotted line 29. It is seen that motor 29 has secured to its shaft 17 a reversing gear 86 meshing with gear 85 carrying the slider 30 of a potentiometer winding 36 similar to the potentiometer winding 31 of thermostat 28 whose temperature responsive bimetal blade 32 forms the slider for winding 31. Included in thermostat 28 is a so called balancing relay 33 with a Y shaped armature 34 adapted for limited rotation in either direction about pivot 35. Surrounding but spaced respectively from the arms of armature 34 are operating coils 44, 45. Coil 44 is in series with wires 54, 55 connecting the left ends of windings 31 and 36, while coil 45 is in series with wires 64 and 65 connecting the right ends of windings 31 and 36. Sliders 30 and 32 are connected respectively to secondary leads 26 and 27 of transformer 25.

Leg 74 of relay 32 forms the blade of a single pole double throw switch having throws 75 and 76.

Current transformer iron core 110 has two windows 111, 112 through the first of which line wire F is threaded and through the second of which is threaded line wire H. The secondary winding 113 wound on the center leg of the transformer will thus totalize the current supplied to all of the loads by the electric service wires and will feed a proportional alternating current through lines 114, 115 to the opposite corners of a full wave rectifier 116 well known in the art. To the other corners of rectifier 116 are connected the direct current load control lines 117, 118 which at all times carry a direct current proportional to the alternating current in lines 114, 115. Condenser 219 connected between lines 114 and 115 is useful in limiting the voltage building up across the secondary winding of the current transformer in case an unusually high impedance should build up in the series circuit of lines 114, 115 on the side of condenser 19 away from the transformer.

Within the dotted line 70 is shown schematically a two load load stabilizer of the type shown in my Patent No. 2,635,196, it being understood that the load stabilizer there shown can be built for any number of loads by adding as many intermediate relays as directed. In the present case we have need for and use only two of the relay units there shown.

As shown in the load stabilizer here used there is a first relay having an armature indicated by the dotted line 80 and a second relay having an armature indicated by the dotted line 90, the first relay having a continuously energized holding coil 38 and an intermittently energized operating coil 37, while the second relay has a continuously energized holding coil 58 and an intermittently energized operating coil 57. Both armatures are biased towards their positions shown in the drawing and move to the right as shown by the arrows when their respective operating coils are sufficiently energized.

Armature 80 is adapted to operate a single pole double throw switch having a blade 40, a normally closed stationary contact 39 and a normally open stationary contact 41, also to operate a single pole single throw switch having a blade 91 and a stationary contact 92.

Armature 90 is adapted to operate a single pole double throw switch having a blade 60, a normally closed stationary contact 59 and a normally open stationary contact 61, also to operate another single pole double throw switch having a blade 95 a normally closed stationary contact 93 and a normally open stationary contact 94.

Wire 118 connects to one side of each of the coils 37, 38, 57, and 58. Wire 117 connects to blade 40 and the other side of coils 58 and 38. Wire 119 connects contact 39 with contact 61 and the other side of coil 37. Wire 123 connects contact 41 with blade 60. Wire 120 connects contact 59 with the other side of coil 57. Condensers 43 and 53 are connected across coils 37 and 57 respectively.

Wire 96 connects blade 91 with the stationary contact of switch 21. Wire 99 connects the stationary contacts of switches 22 and 75 with stationary contact 94. The operation of the system of Fig. 1 is as follows. Assuming that the electric service wires F, G, H, are energized from a suitable electric source; loads X, Y, Z of primary importance but probable variable in total size are connected as shown; thermostat 28 is connected as shown and located in a space to be heated; loads of unequal and secondary importance A, B, C, are connected to lines F, G, H, through switches 11, 12, 13, respectively, as shown, to supply heat to the space; and that the total of all the loads is below the limit set by stabilizer 70 so that the stabilizer is in the condition shown with switch blades 91 and 95 resting against contacts 92 and 93 respectively; then should the space temperature drop, thermostat blade 32 will move to the right on winding 31 causing a decrease of current flow from transformer 25 through wire 26, slider 30, winding 36, wire 55, coil 44, wire 55, winding 31, blade 32, and wire 27, and causing an increase of current flow from slider 30, through winding 36, wire 65, coil 45, wire 64 and winding 31 to blade 32. The greater current flow through coil 45 and the lesser flow through coil 44 will cause armature 34 of relay 32 to rotate counter-clockwise to close switch 76, but because all heaters A, B & C are already energized through switches 11, 12, and 13 closed by cams 14, 15, 16 on shaft 17 and forward limit cam 23 on shaft 17 has opened forward limit switch 21, the closing of switch 76 cannot energize motor windings 18, 19 from transformer 25.

However should the temperature of the space increase to a value where thermostat blade 32 moves to the left and thereby increases the current flow through coil 44, armature 34 of relay 32 will close switch 75 and current from transformer 25 will flow through wire 26, motor winding 19, in parallel with motor winding 18 and condenser 20, reverse limit switch 22, wire 99, switch 75, wire 97, switch 93, 95, and wire 27 thus causing the motor to revolve in the reverse direction until cam 14 drops switch 11 open to disconnect heater A. At the same time slider 30 will move to the right driven by reversing gears 85, 86 and shaft 17 thus tending to rebalance the currents through coils 44 and 45 of relay 32 and move armature leg 74 to the open position of switches 75, 76. Should this movement of the motor in dropping load A and repositioning slider 30 together with the temperature decrease in the space due to dropping load A not sufficiently balance relay 32 to open switch 75 the motor will continue to run in the reverse direction and drops loads B and C until relay 32 is balanced or until limit switch 22 opens to stop the motor.

It is thus seen that while switches 91, 92, and 95, 93 are closed as shown the heating loads A, B, C, etc. are under the control of thermostat 28 which through the operation of the reversing motor can add or drop loads A, B, C, etc. as required.

Usually the heating load elements are larger in number of which only A, B, and C are here shown as typical to illustrate my system. Also it should be remembered that primary loads X, Y, and Z are under their separate controls and variable in rate of energy use and that the maximum energy which can be drawn from lines F, G, and H by all of the loads may be many times their average total use of energy and considerably higher than desired for various reasons. For these reasons load limiter or stabilizer 70 is connected into the system to prevent the occurrence of excessive peaks of energy use.

As fully explained in my Patent No. 2,635,196, the current transformer totalizes the current drawn from lines F, G, H, and feeds a proportional secondary alternating current through wires 114, 115 to full wave rectifier 116 which in turn feeds an equivalent direct current through wires 117, 118 to relay coils 38 and 58 and through switch 39, 40 to coil 37. Should the current through coils 37, 38 exceed an adjusted limit armature 80 will move to the right opening switch 91, 92 and thus prevent thermostat 28 from energizing the reversing motor and adding more of the loads A, B, C, etc.

At the same time armature 80 opens switch 39, 40 to deenergize coil 37 and closes switch 40, 41 to energize coil 57. In this high total load condition coil 38 will be sufficiently energized to hold armature 80 thrown to the right. Now if the total load is above the adjusted limit for coils 57 and 58 to throw armature 90 to the right, switch 59, 60 will be opened to deenergize coil 57 and switch 60, 61 will be closed to reenergize coil 37. At this stage of energization coil 58 will be holding armature 90 to the right and of course with coil 37 now energized armature 80 will remain to the right until the total load has reduced to a point where coil 58 releases armature 90 to return to the left and open switch 60, 61 to deenergize coil 37. Then if the total load is again reduced coil 38 will be deenergized sufficiently to drop armature 80 back to the left.

When as above explained armature 90 moves to the right it opens switch 93, 95 and closes switch 94, 95.

Opening switch 93, 95, opens the only motor energizing circuit through relay 32 of thermostat 28 and thereby removed the reversing motor from the control of the thermostat. Closing switch 94, 95, energizes the reversing motor in the reverse direction directly from transformer 25 through line 27, switch 94, 95, limit switch 22, motor windings 18, 19, and wire 26 thus operating the motor to disconnect loads A, B, C, etc. until the total load is reduced to the preset value at which coil 58 will release armature 90 to return to the left opening switch 94, 95 and closing switch 93, 95 which will allow the thermostat to take over and further reduce the loads A, B, C, etc. if it desires. However the thermostat still cannot increase the use of loads A, B, C, etc. until the total load has dropped to deenergize coil 38 sufficiently to release armature 80.

In Fig. 2 is shown a similar arrangement of loads and load stabilizing mechanism used in connection with a different form of thermostat and a modified reversing motor circuit. In Fig. 2 the thermostat 128 comprises a resilient bimetal blade 130 anchored at its top and, biased towards the right by a tension spring 129 and towards the left by a floating armature 131 variably positioned against the bias of spring 129 by the magnetic field of coil 132 variably energized from transformer 25 through motor potentiometer winding 136 and slider 139 fixed to shaft 17 of motor 129. The circuit of coil 132 is from transformer 25, through wire 26, slider 139, winding 136, balancing resistor 141, wire 140, coil 132 and wire 27 to transformer 25.

Bimetal 130 forms the blade of a single pole double throw switch having stationary contacts 133 and 134. Stationary contact 133 is connected through wire 196, switch 91, 92 of stabilizer 70, and wire 198 to forward limit switch 21 of motor 129. Stationary contact 134 is connected through wire 199 to reverse limit switch 22 of motor 129. Stabilizer single pole double throw switch 93, 94, 95 has fixed contact 93 connected by wire 197 to the fixed end of bimetal 130, blade 95 connected to transformer lead 27, and fixed contact 94 connected to wire 199.

Frome the above discussion of Fig. 1 it will be understood that as shown in Fig. 2, when the total load on the system is below a preset limit the reversing motor 129 is under the direct control of thermostat 128 but should the preset load limit be exceeded, stabilizer switch 91, 92 will first open to interrupt the forward running motor circuit through throw 130, 133 of the thermostat and should the load still exceed a preset limit stabilizer switch 93, 95 will be opened to incapacitate the thermostat completely and switch 94, 95 will be closed to run the motor in a reverse direction to cut off loads A, B, C, etc. until the total load is reduced below the preset limit.

The operation of the thermostat of Fig. 2 is as follows. Should bimetal 130 balanced between the biases of armature 131 and spring 129 be cooled and contact 133 be touched thereby, motor 129 will start in the forward direction to add more heaters of the group A, B, C, etc. and at the same time slider 139 will move to the right and increase the resistance of the part of winding 136 included in circuit with coil 131. This will weaken the pull of armature 131 on bimetal 130 and allow spring 129 to move bimetal 130 away from contact 133 to stop the motor. On the other hand should bimetal 130 be warmed and contact 134 be touched thereby motor 129 will rotate in the reverse direction to drop heaters of the group A, B, C, etc. and at the same time slider 139 will move to the left and decrease the resistance of the part of winding 136 included in circuit with coil 131 which will strengthen the pull of armature 131 to overcome the bias of spring 129 to move bimetal 130 away from contact 134 to stop the motor.

It should be particularly noted that in the schemes of both Figs. 1 and 2, it is assumed that the electric heating load when within the limit of size controlled by the stabilizer is under the control of a single thermostat. However there are many installations where the individual heating loads are each controlled by their individual thermostats, and it is desirable to have as many as possible of the loads A, B, C, etc. available at all times to be energized or deenergized by their individual thermostats in accordance with their needs.

This arrangement is simply provided in either of the schemes of Fig. 1 or Fig. 2 by omitting entirely the thermostats 28 or 128 and omitting the potentiometers 30, 36 or 139, 136 from motors 29 and 129 respectively. Then in Fig. 1 wires 96, 97 are connected together or in Fig. 2 wires 196, 197 are connected together. In this case it is plain that when the total load is under a preset limit the motor will be energized in the forward direction until the preset limit is reached or all the loads are added and the forward limit switch 21 is opened. However if at any time the loads fluctuate in use to give a total in excess of a preset limit, stabilizer switch 91, 92 will open as explained above, and the forward circuit of the motor will be interrupted. Then as also explained above, if a preset total load limit is exceeded switch 94, 95 will close to energize the reverse circuit of the motor to drop loads A, B, C, etc. until the total load is within the desired limit.

Having thus recited some of the objects of my invention, described three forms in which my invention may be constructed and explained the operation of each of them, I claim:

1. A total load stabilized electric system comprising a source of power, multiple electric loads adapted to be usefully connected to said source of power, some of said loads being of different relative importance, motor means adapted for connecting said some of said loads to said source of power in the order of their relative importance and for disconnecting said some of said loads from said source of power in the inverse order of their relative importance, a first sensing means for sensing the power supplied by said source to all of said multiple electric loads, a second sensing means responsive to a varying need for power to be supplied by said some of said loads, means adapting said second sensing means to operate said motor to connect or disconnect said some of said loads to or from said source as required, and means adapting said first sensing means when said total load is above a preset value to render said second sensing means ineffective to add said some of said loads to said source, together with means adapting said first sensing means to operate said motor to disconnect said some of said loads from said source when said total load is above a preset value after said second sensing means has been rendered ineffective.

2. The system of claim 1 in which said motor means comprises a reversible electric motor and a series of sequentially operable electric switches operable thereby.

3. The system of claim 1 in which said second sensing means includes a potentiometer with a temperature responsive slider therefore and said motor includes a potentiometer with a slider operable by said motor.

4. The system of claim 1 in which said second sensing means includes a temperature responsive element biased in one direction of movement by an electromagnetic means and in which said motor includes means operable by said motor for gradually compensating said electromagnetic means to vary its bias on said element in the direction of stopping said motor.

5. A total load stabilized electric system comprising a source of power, multiple electric loads adapted to be usefully connected to said source of power, some of said loads being of different relative importance, motor means adapted for connecting said some of said loads to said source of power in the order of their relative importance and for disconnecting said some of said loads from said source of power in the inverse order of their relative importance, means for sensing the total power supplied by said source to all of said multiple electric loads and means adapting said sensing means to operate said motor sequentially to connect in the order of their relative importance said some of said loads to said source of power when said total power is below a preset value and means adapting said sensing means to operate said motor sequentially to disconnect in the inverse order of their relative importance said some of said loads from said source of power when said total power is above a preset value.

References Cited in the file of this patent

UNITED STATES PATENTS 2,348,058   Coates et al. _____ May 2, 1944